United States Patent
Vollmer et al.

(10) Patent No.: US 8,947,029 B2
(45) Date of Patent: Feb. 3, 2015

(54) METHOD AND DEVICE FOR ASCERTAINING THE ROTOR TEMPERATURE OF A PERMANENT-MAGNET SYNCHRONOUS MACHINE

(75) Inventors: Ulrich Vollmer, Bissingen (DE); Matthias Bitzer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 988 days.

(21) Appl. No.: 12/737,517

(22) PCT Filed: Jul. 9, 2009

(86) PCT No.: PCT/EP2009/058759
§ 371 (c)(1),
(2), (4) Date: Apr. 5, 2011

(87) PCT Pub. No.: WO2010/009984
PCT Pub. Date: Jan. 28, 2010

(65) Prior Publication Data
US 2011/0181217 A1    Jul. 28, 2011

(30) Foreign Application Priority Data
Jul. 25, 2008   (DE) .......................... 10 2008 040 725

(51) Int. Cl.
*H02H 7/09* (2006.01)
*H02P 6/00* (2006.01)
(Continued)

(52) U.S. Cl.
CPC .............. *G01K 7/42* (2013.01); *H02P 29/0044* (2013.01); *H02P 29/0066* (2013.01); *G01K 2205/00* (2013.01)
USPC ................. 318/400.21; 318/400.01; 318/700; 374/29

(58) Field of Classification Search
CPC ............. H02P 6/14; H02P 6/001; H02P 6/12; H02P 6/22; H02H 7/093
USPC .................... 318/400.21, 400.01, 700; 374/29
See application file for complete search history.

(56) References Cited

U.S. PATENT DOCUMENTS 4,926,105 A * 5/1990 Mischenko et al. .......... 318/800
5,334,923 A * 8/1994 Lorenz et al. ................. 318/805
(Continued)

FOREIGN PATENT DOCUMENTS

DE        102 54 295        6/2004

OTHER PUBLICATIONS

Monitoring the Thermal Condition of Permanent-Magnet Synchronous Motors; IEEE Transactions on Aerospace and Electronic Systems, IEEE vol. 32, No. 4, Oct. 1, 1996, pp. 1421-1429.*
(Continued)

*Primary Examiner* — Eduardo Colon Santana
*Assistant Examiner* — Gabriel Agared
(74) *Attorney, Agent, or Firm* — Kenyon & Kenyon LLP

(57) ABSTRACT

A method for ascertaining the rotor temperature of a permanent-magnet synchronous machine (10), in which a first estimate ($T_{R1}$) for the rotor temperature is ascertained as a function of a remanent flux density of permanent magnets contained in a rotor of the synchronous machine (10). A second estimate ($T_{R2}$) for the rotor temperature is ascertained via a Kalman filter containing a thermal model of the synchronous machine (10), the first estimate ($T_{R1}$) for the rotor temperature being supplied at least intermittently to the Kalman filter.

17 Claims, 1 Drawing Sheet

(51) Int. Cl.
*G01K 17/00* (2006.01)
*G01K 7/42* (2006.01)
*H02P 29/00* (2006.01)

(56) References Cited

U.S. PATENT DOCUMENTS

| | | | |
|---|---|---|---|
| 5,510,689 A * | 4/1996 | Lipo et al. | 318/809 |
| 6,633,149 B1 * | 10/2003 | Foureys | 318/567 |
| 7,276,877 B2 * | 10/2007 | Qiu et al. | 318/721 |
| 2005/0007044 A1 * | 1/2005 | Qiu et al. | 318/254 |
| 2006/0250154 A1 * | 11/2006 | Gao et al. | 324/772 |
| 2009/0224707 A1 * | 9/2009 | Williams et al. | 318/400.02 |

OTHER PUBLICATIONS

Peyman, Milanfar et al..: "Monitoring the Thermal Condition of Permanent-Magnet Synchronous Motors" IEEE Transactions on Aerospace and Electronic Systems, IEEE Service Center, Piscataway, NJ, US, vol. 32, No. 4, Oct. 1, 1996, pp. 1421-1429.

* cited by examiner

METHOD AND DEVICE FOR ASCERTAINING THE ROTOR TEMPERATURE OF A PERMANENT-MAGNET SYNCHRONOUS MACHINE

BACKGROUND OF THE INVENTION

1. Field of the Invention

The present invention relates to a method and a device for ascertaining the rotor temperature of a permanent-magnet synchronous machine, in which a first estimate of the rotor temperature is ascertained as a function of a remanent flux density of permanent magnets contained in a rotor of the synchronous machine.

2. Description of the Related Art

In permanent-magnet synchronous machines, the permanent magnets of the rotor are usually the components most sensitive to temperature because if the temperature even briefly exceeds the Curie temperature of the magnetic material used, it will cause damage to the magnets, in particular loss of their magnetization. Therefore, temperature monitoring of the rotor of the synchronous machine is advisable to protect the permanent magnets, so that the synchronous machine may be deactivated, e.g., shortly before reaching the Curie temperature.

Monitoring of the rotor temperature is technically complex due to the rotor movement. Known methods therefore propose ascertaining the rotor temperature from the more easily detectable electrical operating variables of the synchronous machine instead of a direct temperature measurement in the rotor.

Such a method is known from published German patent application document DE 102 54 295 A1 and utilizes the effect whereby the remanent flux density of the permanent magnets of the rotor depends on their temperature or on the rotor temperature. Consequently, the amplitude of the synchronous internal voltage of the synchronous machine is a function of the rotor temperature. The known method has the disadvantage that the rotor temperature is ascertained on the basis of a linear model, which is valid only in a restricted operating range of the synchronous machine due to magnetic saturation effects, among other things, and offers inadequate precision for many applications.

SUMMARY OF THE INVENTION

Accordingly, the object of the present invention is to improve upon a method and a device of the type defined in the introduction, to the effect that increased precision is achieved in ascertaining the rotor temperature.

This object is achieved in a method of the type defined above according to the present invention by ascertaining a second estimate for the rotor temperature via a Kalman filter containing a thermal model of the synchronous machine, the first estimate for the rotor temperature being supplied at least intermittently to this Kalman filter. In other words, according to the present invention, in addition to the first estimate, which is known from the traditional methods, a second estimate is also ascertained. The use of the thermal model of the synchronous machine allows a particularly advantageous estimate of the rotor temperature here based on input variables, which are detectable by measurement with little complexity, e.g., the stator temperature. An increased precision in ascertaining the rotor temperature is advantageously achieved through the combination of the conventional first estimate with the Kalman filter containing the thermal model according to the present invention.

The first estimate for the rotor temperature as well as a measured value for the stator temperature may be advantageously supplied according to the present invention to the Kalman filter, in particular for the correction step, the first estimate for the rotor temperature in particular being also used in the sense of a measured variable to obtain a new second estimate via the newly calculated Kalman gain.

In an advantageous specific embodiment of the method according to the present invention, a particularly simple evaluation of the Kalman filter from the mathematical standpoint is obtained when either only the first estimate for the rotor temperature or the measured value for the stator temperature is supplied to the Kalman filter, in particular for a correction step. It is therefore advantageously possible to omit a matrix inversion of the 2×2 output matrix or measurement matrix in ascertaining the Kalman gain as part of the correction step of the Kalman filter.

The exclusive evaluation of just one of the two variables within one iteration of the Kalman filter proposed according to the present invention advantageously makes it possible to use a simpler output matrix, so that instead of a matrix inversion, a division by a scalar quantity is possible.

The method according to the present invention nevertheless offers an increased precision in comparison with the traditional approach because the first estimate for the rotor temperature or the measured value for the stator temperature may be used for the correction step of the Kalman filter, for example, alternating in successive iterations, and thus both values contribute to the refinement of the second estimate obtained via the Kalman filter. These two values may also be used in an irregular order instead of an alternating use. For example, whenever there is a new first estimate for the rotor temperature, the first estimate for the rotor temperature is used by the Kalman filter as the "measured variable" and otherwise the Kalman filter is evaluated using the stator temperature detected by measurement as the measured variable.

In an advantageous specific embodiment of a variant of the present invention, it is advantageously provided that for ascertaining the second estimate precisely, the thermal model of the synchronous machine has at least the stator, rotor and cooling water as components, heat transfers among all components preferably being taken into account.

According to the present invention, it is also possible to use thermal conductance values among the components of the thermal model as a function of a rotational speed of the synchronous machine to increase precision.

The functionality of the device according to the present invention may advantageously be integrated into a traditional control unit for a synchronous machine, wherein the method steps according to the present invention are executable, e.g., by an arithmetic unit of the control unit.

Additional features, possible applications and advantages of the present invention are derived from the following description of exemplary embodiments of the present invention, which are illustrated in the figures of the drawings. All the features that are described or illustrated here, either alone or in any combination, constitute the subject matter of the present invention, regardless of how they are combined in the patent claims or their references back to preceding claims and regardless of how they are described in the description and/or illustrated in the drawings.

DETAILED DESCRIPTION OF THE INVENTION

Figure 1:
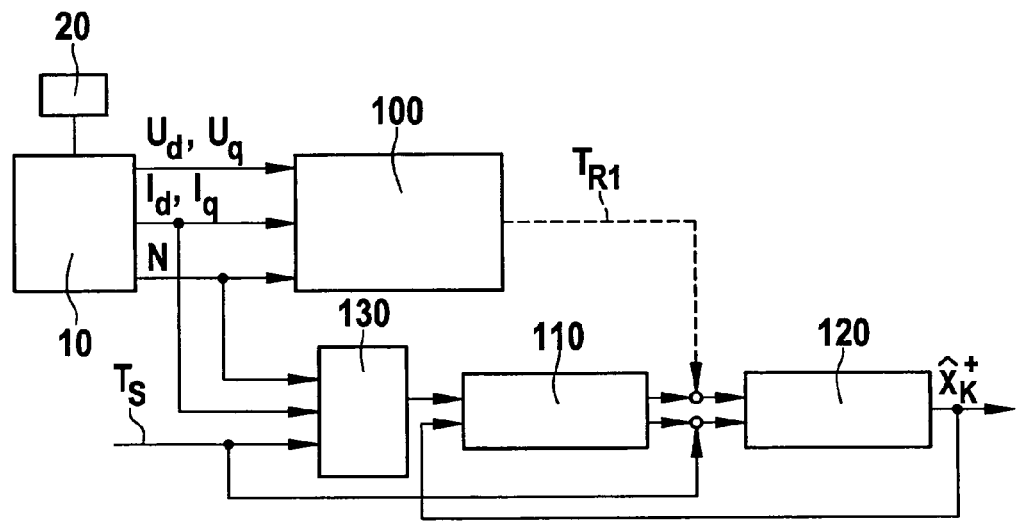
FIG. 1 schematically shows a function diagram of a specific embodiment of the method according to the present invention.

FIG. 1 schematically shows a permanent-magnet synchronous machine 10, which is controlled by a control unit 20 assigned to it. Electrical operating variables $U_d$, $U_q$, $I_d$, $I_q$ and rotational speed N of synchronous machine 10 are sent to an estimator unit 100, which uses them to calculate a first estimate $T_{R1}$ for the rotor temperature of synchronous machine 10.

Operating variables $U_d$, $U_q$ correspond to the voltage of synchronous machine 10 in the d direction and q direction, respectively, and operating variables $I_d$, $I_q$ correspond to the current of synchronous machine 10 in the d direction and q direction, respectively.

The operating principle of estimator unit 100 is based on the temperature dependence of the remanent flux density of the permanent magnets of the rotor of synchronous machine 10. Since the amplitude of the synchronous internal voltage of synchronous machine 10 is also a function of the rotor temperature, estimator unit 100 may form a first estimate $T_{R1}$ for the rotor temperature according to the equation:

$$T_{R1} = T_{R0} + \frac{K_m(T_{R1}) - K_{m0}}{\alpha \cdot K_{m0}}$$

where $\alpha$ is the temperature coefficient of the remanent flux density, $K_{m0}$ is a reference value of the remanent flux density at reference temperature $T_{R0}$ and:

$$K_m(T_{R1}) = \frac{U_q - R \cdot I_q}{\omega} - L_d \cdot I_d.$$

Temperature coefficient $\alpha$ and reference values $K_{m0}$, $T_{R0}$ may be ascertained, for example, by measurement under suitably defined operating conditions and stored for normal operation of synchronous machine 10 and execution of the method according to the present invention.

Temperature-dependent remanent flux density $$K_m(T_{R1}) = \frac{U_q - R \cdot I_q}{\omega} - L_d(I_d) \cdot I_d$$

is obtained from the steady-state model of synchronous machine 10 using the simplifications described below:

$$U_d = R \cdot I_d - L_q \cdot I_q \cdot \omega \quad \text{(equation 1a)}$$

$$U_q = R \cdot I_q + L_d \cdot I_d \cdot \omega + K_m \cdot \omega \quad \text{(equation 1b)}$$

where $U_d$, $U_q$ denote the voltage of synchronous machine 10 in the d direction and q direction, respectively, $I_d$, $I_q$ denote the current of synchronous machine 10 in the d direction and q direction, respectively, and $L_d$, $L_q$ denote the corresponding inductances, where R is a strand resistance, $\omega$ is the electrical angular velocity, and $K_m$ is the temperature-dependent fundamental-wave amplitude of the field-linked direct-axis flux or the remanent flux density.

The following approximations are preferably made to simplify the evaluation of the steady-state model of synchronous machine 10 as presented above:

a) Experience has shown that it is sufficient to take into account only a dependence on current $I_q$ for temperature-dependent remanent flux density $K_m(T_{R1})$.

b) Estimate $T_{R1}$ is preferably obtained from equation (1b) so that inductance $L_q$ need not be evaluated.

c) The validity range of the model may be restricted to the case when $I_q = 0$.

On the whole, under these assumptions this yields: for first estimate $T_{R1}$:

$$T_{R1} = T_{R0} + \frac{K_m(T_{R1}) - K_{m0}}{\alpha \cdot K_{m0}}$$

Where $$K_m(T_{R1}) = \frac{U_q - R \cdot I_q}{\omega} - L_d \cdot I_d.$$

In the case of simplification $I_q = 0$, the following equation ultimately applies:

$$K_m(T_{R1}) = \frac{U_q}{\omega} - L_d \cdot I_d.$$

The advantage of the simplification described above is that first estimate $T_{R1}$ may be formed only under the corresponding operating conditions, e.g., $I_q = 0$, and therefore cannot always readily be formed anew for a different operating situation.

As an alternative to the simplified consideration described above, equations (1a) and (1b) of this steady-state model for $U_d$, $U_q$ may also be evaluated without simplifying assumptions, in which case the precision of first estimate $T_{R1}$ increases accordingly; in particular an instantaneous value may also be obtained in operating situations other than that on which the simplification is based.

In order for the model of equations (1a) and (1b) to also be valid for the case of magnetic saturation, it may be provided according to the present invention that inductances $L_d$, $L_q$ and variable $K_m(T_{R1})$ are determined as a function of currents $I_d$, $I_q$, i.e., parameters $I_d$, $I_q$, $K_m(T_{R1})$ are then functions of two variables, so that a real-time-capable determination with the help of corresponding characteristics maps is available.

In general, to ascertain first estimate $T_{R1}$ for the rotor temperature, any other method which ascertains the rotor temperature as a function of a remanent flux density may be used additionally or as an alternative.

To allow a more precise determination of the rotor temperature, the method according to the present invention provides, in addition to the consideration of first estimate $T_{R1}$, that a second estimate $T_{R2}$ for the rotor temperature is ascertained via a Kalman filter containing a thermal model of synchronous machine 10, first estimate $T_{R1}$ for the rotor temperature being supplied to this Kalman filter at least intermittently.

In other words, the thermal model according to the present invention for the rotor temperature, which is evaluated by the Kalman filter, is expanded further according to the present invention by first estimate $T_{R1}$ so that it is possible to ascertain the rotor temperature more precisely than with the traditional methods. In particular, the thermal model according to the present invention advantageously also allows the stator temperature of synchronous machine 10 to be taken into account.

The thermal behavior of synchronous machine 10 may be described approximately by a thermal network, which includes at least the nodes "stator," "rotor" and "cooling water" but may also be modeled to be more complex, if necessary.

Heat transfers are preferably assumed among all components, so that the following equations are obtained for thermal capacitances $c_{p,R}$, $c_{p,S}$:

$$C_{p,R}\dot{T}_{R2}=G_{RS}(T_S-T_{R2})+G_{RK}(T_K-T_{R2})+PV_R \quad \text{(equation 2a)}$$

$$c_{p,S}\dot{T}_S=G_{RS}(T_{R2}-T_S)+G_{SK}(T_K-T_S)+PV_S \quad \text{(equation 2b)}$$

Variable $\dot{T}_{R2}$ here represents the change in second estimate $T_{R2}$ for the rotor temperature, which is considered according to the present invention, as a function of time, and variable $\dot{T}_s$ here represents the change in stator temperature $T_s$ over time, which can be determined by measurement relatively easily in contrast with the rotor temperature of synchronous machine 10 due to the steady-state stator.

Variables $G_{RS}(N)$, $G_{RK}(N)$, $G_{SK}(N)$ represent the thermal conductance values as a function of rotational speed N of synchronous machine 10 among the rotor (index "R"), stator (index "S") and cooling water (index "K") components. Variable $G_{RS}(N)$ denotes the thermal conductance between the rotor and stator, for example.

Temperature $T_K$ of the cooling water is assumed to be known. Like stator temperature $T_S$, this may also be detected easily by measurement and therefore together with the latter forms an input variable of the thermal model according to the present invention. Additional input variables of the thermal model according to the present invention include power loss values $PV_s$, $PV_R$, which act as a heat source on the stator and rotor, which are functions of currents $I_d$, $I_q$, rotational speed N, and the temperatures of the stator and rotor.

In a particularly preferred variant of the method according to the present invention, it is assumed for the purpose of simplification that the dependence of power loss $PV_S$, $PV_R$ on the rotor temperature is weak and therefore is negligible in first approximation.

A representation of the state of the thermal model of synchronous machine 10 according to the present invention, which has been discretized over time, according to equations (2a) and (2b) using time index k=0, 1, . . . yields:

$$x_{k+1}=A_d x_k + B_d u_k \quad \text{(equation 3)}$$

having the state vector:

$$x_k = \begin{bmatrix} T_{R2,k} \\ T_{S,k} \end{bmatrix},$$

$$x_{k+1} = \begin{bmatrix} T_{R2,k+1} \\ T_{S,k+1} \end{bmatrix},$$

of the system matrix defined by the thermal model:

$$A_d = \begin{bmatrix} 1-\dfrac{\Delta t(G_{RS}+G_{RK})}{c_{p,R}} & \dfrac{\Delta t \cdot G_{RS}}{c_{p,R}} \\ \dfrac{\Delta t \cdot G_{RS}}{c_{p,S}} & 1-\dfrac{\Delta t(G_{RS}+G_{SK})}{c_{p,S}} \end{bmatrix},$$

of the input matrix:

$$B_d = \begin{bmatrix} \dfrac{\Delta t \cdot G_{RK}}{c_{p,R}} & \dfrac{1}{c_{p,R}} & 0 \\ \dfrac{\Delta t \cdot G_{SK}}{c_{p,S}} & 0 & \dfrac{1}{c_{p,S}} \end{bmatrix},$$

and having the input vector:

$$u_k = \begin{bmatrix} T_{K,k} \\ PV_{R,k} \\ PV_{S,k} \end{bmatrix}.$$

On the basis of the thermal model according to equation (3), a Kalman filter is designed according to the present invention and used to ascertain second estimate $T_{R2}$ for the rotor temperature.

The Kalman filter formed according to the present invention provides for the execution of a prediction step at a sampling time $t_k$ according to:

$$\hat{x}_{k+1}^- = A_d x_k^+ + B_d u_k$$

$$P_{k+1}^- = A_d P_k^+ A_k^T + Q$$

and then the correction step for evaluation of the measurement according to:

$$K_{k+1} = P_{k+1}^- H_R (H_R P_{k+1}^- H_R^T + R_M)^{-1}$$

$$\hat{x}_{k+1}^+ = \hat{x}_{k+1}^- + K_k (y_{k+1} - H_R \hat{x}_{k+1}^-)$$

$$P_{k+1}^+ = (I - K_{k+1} H_R) P_{k+1}^-,$$

where:

$$y_k = [0\ 1] x_k$$

forms a measured variable in the sense of the Kalman filter, where first:

$$H_R = [0\ 1] \quad \text{(equation 4a)}$$

forms the output matrix or measurement matrix.

The calculations associated with the prediction step are represented by function block 110 in FIG. 1, and the calculations associated with the correction step are represented by function block 120 in FIG. 1. Function block 130 represents in general all other calculations within the scope of the evaluation of the thermal model of synchronous machine 10 according to the present invention.

Matrix Q, measurement error covariance matrix $R_M$ and a starting value for matrix P are to be selected in a suitable manner with which those skilled in the art are familiar. Matrix I is the unity matrix.

Vector of state $\hat{x}_k^+$ at the output of function block 120 contains second estimate $T_{R2}$ for the rotor temperature at point in time $t_k$.

Through the choice of the output matrix according to equation (4a), this achieves the result that in evaluation of the Kalman filter according to the prediction and correction steps described above as a measured variable for the Kalman filter, only stator temperature $T_{S,k}$ from the following vector is used:

$$x_k = \begin{bmatrix} T_{R2,k} \\ T_{S,k} \end{bmatrix},$$

This advantageously yields a particularly simple mathematical evaluation of the Kalman filter because a matrix inversion of a 2×2 output matrix may advantageously be omitted in the correction step of the Kalman filter, and only the simple output matrix $H_R=[0\ 1]$ enters into the correction step of the Kalman filter. Therefore, no complex matrix inversion need be performed but instead only division by a scalar quantity is necessary to ascertain the Kalman gain according to $$K_{k+1} = P_{k+1}^- H_R (H_R P_{k+1}^- H_R^T + R_M)^{-1}$$

The special advantage of the method according to the present invention lies in the combination of the thermal model described above with first estimate $T_{R1}$ ascertained otherwise, i.e., from the model according to equations (1a), (1b).

This combination is advantageously achieved according to the present invention by using, at least intermittently, instead of the output matrix:

$$H_S = [0\ 1] \qquad 5$$

the output matrix:

$$H_R = [1\ 0]$$

which has the effect that now only first estimate $T_{R1}$ for the rotor temperature is used in the correction step of the Kalman filter in the form of second estimate $T_{R2,k}$ from the vector:

$$x_k = \begin{bmatrix} T_{R2,k} \\ T_{S,k} \end{bmatrix}$$

In other words, for the evaluation of the Kalman filter according to the present invention, $T_{R2,k} = T_{R1}$ is selected for the transfer of first estimate $T_{R1}$ of estimator unit 100 into the Kalman filter.

Thus according to the present invention, variable $T_{R2,k}$ is advantageously the time-discrete representation of first estimate $T_{R1}$ as ascertained by estimator unit 100. There is therefore advantageously the option of forming a second estimate $T_{R2}$ for the rotor temperature on the one hand via the Kalman filter as a function of the thermal model according to equations (2a) and (2b) and stator temperature $T_S$. On the other hand, second estimate $T_{R2}$ may be refined advantageously using the output matrix:

$$H_R = [1\ 0]$$

by including first estimate $T_{R1}$ in the iteration process of the Kalman filter.

Thus, through an appropriate choice of output matrix H, either first estimate $T_{R1}$ or stator temperature $T_S$ may be selected for the correction step of the Kalman filter. The choice may be made in alternation, according to some other regular scheme, which is based on the time grid of the estimation by estimator unit 100, for example, or may also take place randomly.

The exclusive evaluation, proposed according to the present invention, of just one of two values $T_{R1}$, $T_S$ within an iteration of the Kalman filter advantageously makes possible the use of a simpler output matrix H, so that instead of a matrix inversion, division by a scalar quantity is made possible.

Nevertheless, the method according to the present invention offers increased precision in comparison with the traditional approach because, for example, both values $T_{R1}$, $T_S$ may be used for the correction step of the Kalman filter in alternation in successive iterations, and thus both values $T_{R1}$, $T_S$ contribute toward the refinement of second estimate $T_{R2}$, which is obtained via the Kalman filter.

Second estimate $T_{R2}$ therefore represents the value ascertained according to the present invention for the rotor temperature, which corresponds better to the actual value of the rotor temperature than do values ascertained conventionally according to investigations by the present applicant.

Both values $T_{R1}$ and $T_S$ may also be used in irregular sequence instead of an alternating use, as already described. For example, whenever a new first estimate $T_{R1}$ is available, first estimate $T_{R1}$ may be used by the Kalman filter and otherwise the Kalman filter is evaluated using stator temperature $T_S$.

Figure 2:
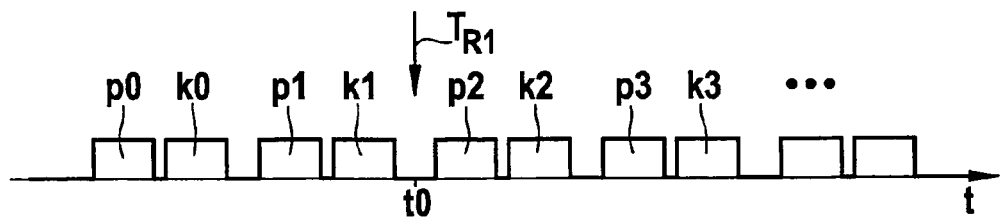
FIG. 2 shows the chronological sequence of individual steps of the method according to the present invention.

FIG. 2 shows the chronological sequence according to the present invention in the evaluation of the Kalman filter, a first prediction step p0 (time index k=0) being performed first according to the equations:

$$\hat{x}_{k+1}^- = A_d \hat{x}_k^+ + B_d u_k$$

$$P_{k+1}^- = A_d P_k^+ A_k^T + Q$$

First prediction step p0 is followed by first correction step k0 according to the equations:

$$K_{k+1} = P_{k+1}^- H_R (H_R P_{k+1}^- H_R^T + R_M)^{-1}$$

$$\hat{x}_{k+1}^+ = \hat{x}_{k+1}^- + K_k(y_{k+1} - H_R \hat{x}_{k+1}^-)$$

$$P_{k+1}^+ = (I - K_{k+1} H_R) P_{k+1}^-,$$

This first iteration p0, k0 of the Kalman filter takes place as an example by using an output matrix of type $H_R=[0\ 1]$, just as in the following second iteration p1, k1.

However, a new first estimate $T_{R1}$ of estimator unit 100 is available at point in time t0 (see the arrow in FIG. 2), so that the following third iteration of the Kalman filter is performed using a different output matrix of the type $H_S=[1\ 0]$ to refine second estimate $T_{R2}$ available at the output of the Kalman filter by using newly formed first estimate $T_{R1}$.

Next, in the fourth iteration and following iterations p3, k3, . . . of the Kalman filter, the output matrix of type $H_R=[0\ 1]$ is again used, for example, until a new first estimate $T_{R1}$ is available.

If error covariance matrix P stabilizes quickly at a steady-state value at a constant rotational speed N of the synchronous machine, then the transient response may be disregarded, and it is always possible to work using steady-state matrix P, so that a new calculation is not constantly necessary, e.g., in control unit 20. In this case, the elements of matrix P may be stored as characteristic curves depending on the rotational speed.

In another specific embodiment of the present invention, which makes it possible to ascertain the rotor temperature in a particularly accurate manner, a third form is selected for the output matrix:

$$H_{RS} = \begin{bmatrix} 1 & 0 \\ 0 & 1 \end{bmatrix}$$

This output matrix $H_{RS}$ allows both values $T_{R2,k}$, $T_{S,k}$ or vector $$x_k = \begin{bmatrix} T_{R2,k} \\ T_{S,k} \end{bmatrix},$$

which are used as "measured values" in the sense of the Kalman filter, to be taken into account simultaneously within one iteration of the Kalman filter, but this requires an enhanced computation complexity accordingly because a matrix inversion is to be performed to form the Kalman gain:

$$K_{k+1} = P_{k+1}^- H_R (H_R P_{k+1}^- H_R^T + R_M)^{-1}$$

The method according to the present invention thus allows a reliable and precise means of ascertaining the rotor temperature of synchronous machine 10 on the whole and offers in particular a greater accuracy than those methods based only on an evaluation of electrical operating variables of synchronous machine 10.

The method according to the present invention is preferably executed by control unit 20.

What is claimed is:

1. A method for ascertaining the rotor temperature of a permanent-magnet synchronous machine comprising: determining a first estimate ($T_{R1}$) for the rotor temperature as a function of a remanent flux density of permanent magnets contained in a rotor of the synchronous machine, and determining a second estimate ($T_{R2}$) of the rotor temperature by using a Kalman filter containing a thermal model of the synchronous machine, the first estimate ($T_{R1}$) for the rotor temperature being supplied to the Kalman filter at least intermittently;

wherein the first estimate ($T_{R1}$) for the rotor temperature and a measured value ($T_S$) for stator temperature are both supplied to the Kalman filter for a correction step; and wherein a steady-state model of the synchronous machine is used for determining the first estimate ($T_{R1}$), for the rotor temperature according to:

$$U_d = R \cdot I_d - L_q \cdot I_q \cdot \omega$$

$$U_q = R \cdot I_q + L_d \cdot I_d \cdot \omega + K_m \cdot \omega$$

where $U_d$, $U_q$ denote the voltage of synchronous machine in the d direction and q direction, respectively, $I_d$, $I_q$ denote the current of the synchronous machine in the d direction and q direction, respectively, and $L_d$, $L_q$ denote the corresponding inductances, where R is a strand resistance, $\omega$ is the electrical angular velocity and $K_m$ is a temperature-dependent fundamental-wave amplitude of the field-linked direct-axis flux.

2. A method for ascertaining the rotor temperature of a permanent-magnet synchronous machine comprising: determining a first estimate ($T_{R1}$) for the rotor temperature as a function of a remanent flux density of permanent magnets contained in a rotor of the synchronous machine, and determining a second estimate ($T_{R2}$) of the rotor temperature by using a Kalman filter containing a thermal model of the synchronous machine, the first estimate ($T_{R1}$) for the rotor temperature being supplied to the Kalman filter at least intermittently;

wherein either only the first estimate ($T_{R1}$) for the rotor temperature or a measured value ($T_S$) for stator temperature is supplied to the Kalman filter for a correction step; and wherein a steady-state model of the synchronous machine is used for determining the first estimate ($T_{R1}$), for the rotor temperature according to:

$$U_d = R \cdot I_d - L_q \cdot I_q \cdot \omega$$

$$U_q = R \cdot I_q + L_d \cdot I_d \cdot \omega + K_m \cdot \omega$$

where $U_d$, $U_q$ denote the voltage of the synchronous machine in the d direction and q direction, respectively, $I_d$, $I_q$ denote the current of the synchronous machine in the d direction and q direction, respectively, and $L_d$, $L_q$ denote the corresponding inductances, where R is a strand resistance, $\omega$ is the electrical angular velocity and $K_m$ is a temperature-dependent fundamental-wave amplitude of the field-linked direct-axis flux.

3. The method as recited in claim 1, wherein the thermal model of the synchronous machine includes at least stator, rotor and cooling water components, and heat transfers among all components is taken into account.

4. The method as recited in claim 1, wherein the thermal model of the synchronous machine includes at least stator, rotor and cooling water components, and heat transfers among all components is taken into account.

5. The method as recited in claim 2, wherein the thermal model of the synchronous machine includes at least stator, rotor and cooling water components, and heat transfers among all components is taken into account.

6. The method as recited in claim 1, wherein the thermal model uses thermal conductance values between its or the components as a function of a rotational speed of the synchronous machine.

7. The method as recited in claim 1, wherein the thermal model takes into account heat losses of a stator and a rotor of the synchronous machine, and a dependence of the heat losses on the rotor temperature are disregarded.

8. The method as recited in claim 1, wherein the thermal model takes into account heat losses of a stator and a rotor of the synchronous machine, and a dependence of the heat losses on the rotor temperature are disregarded.

9. The method as recited in claim 2, wherein the thermal model takes into account heat losses of a stator and a rotor of the synchronous machine, and a dependence of the heat losses on the rotor temperature are disregarded.

10. The method as recited in claim 3, wherein the thermal model takes into account heat losses of a stator and a rotor of the synchronous machine, and a dependence of the heat losses on the rotor temperature are disregarded.

11. The method as recited in claim 1, wherein for determining the first estimate ($T_{R1}$) for the rotor temperature, the synchronous machine is operated temporarily at an operating point at which no saturation prevails.

12. The method as recited in claim 1, wherein inductances $L_d$, $L_q$ and the fundamental-wave amplitude of field-linked direct-axis flux $K_m$ are each ascertained as a function of currents $I_d$, $I_q$, using characteristics maps.

13. The method as recited in claim 11, wherein inductances $L_d$, $L_q$ and the fundamental-wave amplitude of field-linked direct-axis flux Km are each ascertained as a function of currents $I_d$, $I_q$, using characteristics maps.

14. The method as recited in claim 1, wherein the first estimate ($T_{R1}$) for the rotor temperature is obtained according to the equation:

$$T_{R1} = T_{R0} + \frac{K_m(T_{R1}) - K_m}{\alpha \cdot K_{m0}}$$

where $\alpha$ is the temperature coefficient of the remanent flux density, $K_{m0}$ is a reference value of the remanent flux density at reference temperature $T_{R0}$, and:

$$K_m(T_{R1}) = \frac{U_q - R \cdot I_q}{\omega} - L_d(I_d) \cdot I_d.$$

15. The method as recited in claim 11, wherein the first estimate ($T_{R1}$) for the rotor temperature is obtained according to the equation:

$$T_{R1} = T_{R0} + \frac{K_m(T_{R1}) - K_{m0}}{\alpha \cdot K_{m0}}$$

where $\alpha$ is the temperature coefficient of the remanent flux density, $K_{m0}$ is a reference value of the remanent flux density at reference temperature $T_{R0}$, and:

$$K_m(T_{R1}) = \frac{U_q - R \cdot I_q}{\omega} - L_d(I_d) \cdot I_d.$$

16. A device for determining the rotor temperature of a permanent-magnet synchronous machine, the device being capable of determining a first estimate ($T_{R1}$) for the rotor temperature as a function of a remanent flux density of permanent magnets contained in a rotor of the synchronous machine, and the device being capable of determining a second estimate ($T_{R2}$) for the rotor temperature via a Kalman filter containing a thermal model of the synchronous machine, the first estimate ($T_{R1}$) for the rotor temperature being supplied at least intermittently to the Kalman filter; and
wherein the first estimate ($T_{R1}$) for the rotor temperature and a measured value ($T_S$) for stator temperature are both supplied to the Kalman filter for a correction step;
wherein a steady-state model of the synchronous machine is used for determining the first estimate ($T_{R1}$), for the rotor temperature according to:

$$U_d = R \cdot I_d - L_q \cdot I_q \cdot \omega$$

$$U_q = R \cdot I_q + L_d \cdot I_d \cdot \omega + K_m \cdot \omega$$

where $U_d$, $U_q$ denote the voltage of the synchronous machine in the d direction and q direction, respectively, $I_d$, $I_q$ denote the current of the synchronous machine in the d direction and q direction, respectively, and $L_d$, $L_q$ denote the corresponding inductances, where R is a strand resistance, ω is the electrical angular velocity and $K_m$ is a temperature-dependent fundamental-wave amplitude of the field-linked direct-axis flux.

17. A device for determining the rotor temperature of a permanent-magnet synchronous machine, the device being capable of determining a first estimate ($T_{R1}$) for the rotor temperature as a function of a remanent flux density of permanent magnets contained in a rotor of the synchronous machine, and the device being capable of determining a second estimate ($T_{R2}$) for the rotor temperature via a Kalman filter containing a thermal model of the synchronous machine, the first estimate ($T_{R1}$) for the rotor temperature being supplied at least intermittently to the Kalman filter, wherein either only the first estimate ($T_{R1}$) for the rotor temperature or a measured value ($T_S$) for stator temperature is supplied to the Kalman filter for a correction step;
wherein a steady-state model of the synchronous machine is used for determining the first estimate ($T_{R1}$), for the rotor temperature according to:

$$U_d = R \cdot I_d - L_q \cdot I_q \cdot \omega$$

$$U_q = R \cdot I_q + L_d \cdot I_d \cdot \omega + K_m \cdot \omega$$

where $U_d$, $U_q$ denote the voltage of the synchronous machine in the d direction and q direction, respectively, $I_d$, $I_q$ denote the current of the synchronous machine in the d direction and q direction, respectively, and $L_d$, $L_q$ denote the corresponding inductances, where R is a strand resistance, ω is the electrical angular velocity and $K_m$ is a temperature-dependent fundamental-wave amplitude of the field-linked direct-axis flux.

* * * * *